2,495,348

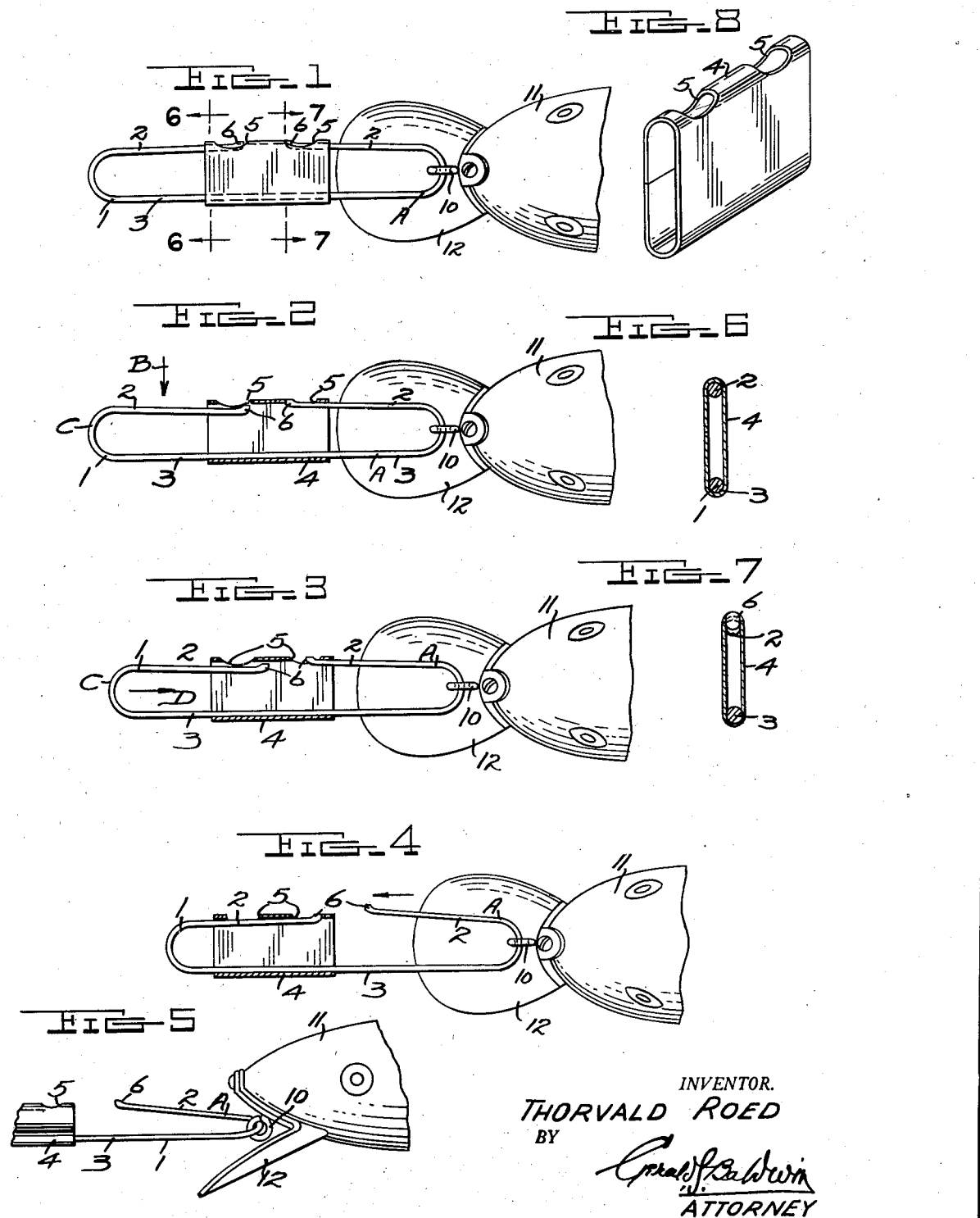
Jan. 24, 1950 — T. ROED — 2,495,348
DOUBLE-ENDED RESILIENT FASTENER
Filed Sept. 4, 1948
INVENTOR.
THORVALD ROED
BY
ATTORNEY Patented Jan. 24, 1950

UNITED STATES PATENT OFFICE 2,495,348

DOUBLE-ENDED RESILIENT FASTENER

Thorvald Roed, Detroit, Mich.

Application September 4, 1948, Serial No. 47,929

1 Claim. (Cl. 24—73)

1

This invention relates to improvements in double-ended resilient fastener, and refers particularly to a fastener intended for such purposes as attaching a fishing line to a bait.

I am aware that a fastener of the same general order has already been made consisting of a substantially loop-shaped resilient member having its extremities laterally bent to engage opposite ends of a slot formed in a sleeve through which the member extends. By pressing the opposite sides of one end of the member toward one another, one bent extremity is released from the slot so that that end of the member may be pulled from the sleeve to permit attachment or detachment of an article on that end of the member. That fastener is, however, open to a number of objections. For instance, to prevent accidental disengagement of the bent extremities from the slot they must project outward beyond the sleeve, and as a result they frequently do considerable damage to a fisherman's hands when he is landing a fish. Again, since these bent extremities extend materially through the slot considerable force is required to press in opposite sides of the member sufficiently to release one extremity from the sleeve. This is particularly objectionable because the end of the fastener on which a bait is attached is hard to get at on account of the conventional spoon guard which is usually provided on a bait adjacent the ring which receives the fastener. Again, it is the end of the fastener in engagement with the bait that must be pulled away from the sleeve to permit removal of the bait from the fastener, and that again is difficult to do.

It is an object of this invention to provide a fastener including a substantially loop-shaped resilient member and a sleeve, wherein the latter has spaced openings formed therethrough each to receive one outwardly flared extremity of the member, and wherein the arrangement is such that the outwardly flared extremities when in engagement with the sleeve do not project beyond the outer face of the latter and yet are so arranged that there is no fear of accidental disengagement of these extremities from the apertures.

Another object of the invention is to provide such a fastener wherein after release of one outwardly flared extremity from the sleeve opening it engages, by pushing that end of the member through the sleeve the other outwardly flared extremity, due to its curvature, moves out of engagement with the other opening and becomes disengaged from the sleeve.

2

A further object of the invention is to provide such a fastener wherein movement of the member relative to the sleeve is stopped by engagement of the outwardly flared extremity which was released from one opening prior to commencement of relative movement of the two parts, upon engagement of that outwardly flared extremity with the other opening in the sleeve.

Having thus stated some of the objects and advantages of the invention, I will now describe it in detail with the aid of the accompanying drawing, in which:

Figure 1 shows a side view of my fastener in closed position secured to the ring of a conventional bait, the latter being shown only in part.

Figure 2 is a similar view but with one outwardly flared extremity disengaged from its opening.

Figure 3 is another similar view showing the member in an intermediate position as it is being moved through the sleeve, and Figure 4 is another similar view but with one extremity of the member disengaged from the sleeve.

Figure 5 is a view taken substantially at right angles to that shown in Figure 4.

Figures 6 and 7 are sections on the lines 6—6 and 7—7 respectively of Figure 1, and Figure 8 is a perspective view of the sleeve.

Referring to the drawing, I designates a substantially loop-shaped resilient member having end portions 2 inwardly folded toward but spaced from one another. These inwardly folded end portions 2 are also transversely spaced from the intermediate portion 3 of the member. The member I is slidable through a sleeve 4 having longitudinally aligned, spaced openings 5 therethrough. The outer extremities 6 of the end portions 2 are outwardly flared and each is in engagement with one of the said openings 5 when the fastener is closed. It will be noted that the outer faces of the flared extremities 6 are then each adapted to bear against one side of either opening 5 so that movement in one direction of the member I relative to the sleeve 4 is prevented by each flared extremity. Since the outer faces of the flared extremities are adapted to bear against the sides of the openings they do not project outwardly beyond the sleeve. Again the curvature of the outwardly flared extremities is such that the flared extremity remote from the end of the fastener being pushed through the sleeve automatically releases itself from engagement with either opening.

When it is desired to disengage the end A of the member 1 from the sleeve 4 the end portion 2 remote from the end A is pushed toward the intermediate portion 3, as indicated by the arrow B in Figure 2, thereby releasing the outwardly flared extremity remote from the end A from its opening 5. Then the member 1 is pushed through the sleeve 4 in the direction of the arrow D in Figure 3 until the outwardly flared extremity adjacent the pushed end C springs into engagement with the other opening 5, whereupon further movement of the member 1 through the sleeve 4 is prevented. However by that time the other outwardly flared extremity has passed out of the sleeve 4 so that an article such as the ring 10 on a conventional bait 11 having a spoon guard 12 thereon may be attached to or detached from that other outwardly flared extremity. To re-engage the free outwardly flared extremity 6 it is merely necessary to press the end and intermediate portions 2 and 3 adjacent that end of the member sufficiently together that the free extremity 6 may be pushed back into the sleeve 4. As previously stated either outwardly flared extremity 6, due to its curvature, automatically releases itself from either opening 5 when travelling toward the transverse center line of the sleeve 4.

While in the foregoing the preferred embodiment of the invention has been described and shown, it is understood that alterations and modifications may be made thereto provided the said alterations and modifications fall within the scope of the appended claim.

What I claim is:

A resilient fastener comprising an elongated loop-shaped resilient member having spaced opposed extremities on one side of the member intermediately of its length, a sleeve extending over both sides of the member and slidable therealong, two longitudinally aligned openings formed through the sleeve spaced the same distance apart as the extremities of the member whereby the fastener is held closed by the sleeve when each extremity of the member is in engagement with one of the openings, said extremities being outwardly flared toward their ends for distance substantially equal to the thickness of the sleeve material to form stops to prevent inward movement and permit outward movement of the sleeve along the member from that end of the latter, whereby when the member is compressed on one side of the sleeve and that extremity released from its sleeve opening said sleeve is free to be moved over the compressed portion and in so doing forces the other outwardly flared extremity inwardly and disengages itself therefrom.

THORVALD ROED.

REFERENCES CITED

The following references are of record in the file of this patent:

UNITED STATES PATENTS

| Number | Name | Date |
|---|---|---|
| 1,623,302 | Buffington | Apr. 5, 1927 |
| 1,719,662 | Jones | July 2, 1929 |
| 2,264,883 | Lent | Dec. 2, 1941 |